(12) United States Patent
Yaguchi et al.

(10) Patent No.: US 9,342,425 B2
(45) Date of Patent: May 17, 2016

(54) TEST APPARATUS AND TEST MODULE

(75) Inventors: Takeshi Yaguchi, Saitama (JP); Hajime Sugimura, Saitama (JP); Takahiro Nakajima, Gunma (JP); Toshiaki Adachi, Gunma (JP)

(73) Assignee: ADVANTEST CORPORATION, Tokyo (JP)

( * ) Notice: Subject to any disclaimer, the term of this patent is extended or adjusted under 35 U.S.C. 154(b) by 681 days.

(21) Appl. No.: 13/430,713

(22) Filed: Mar. 27, 2012

(65) Prior Publication Data

US 2013/0231886 A1 Sep. 5, 2013

(30) Foreign Application Priority Data

Mar. 1, 2012 (JP) ................. 2012-045889

(51) Int. Cl.
*G01R 27/28* (2006.01)
*G06F 11/273* (2006.01)

(52) U.S. Cl.
CPC ................... *G06F 11/273* (2013.01)

(58) Field of Classification Search
CPC ................................................. G06F 11/273
See application file for complete search history.

(56) References Cited

U.S. PATENT DOCUMENTS

| | | | | |
|---|---|---|---|---|
| 2004/0225459 A1* | 11/2004 | Krishnaswamy | .. | G01R 31/3183 702/57 |
| 2005/0034043 A1* | 2/2005 | Takizawa | ........... | G01R 31/3191 714/742 |
| 2005/0262412 A1* | 11/2005 | Mukai | ............. | G01R 31/31907 714/742 |
| 2008/0221824 A1 | 9/2008 | Kumaki | | |
| 2010/0082284 A1* | 4/2010 | Adachi | ............. | G01R 31/2834 702/120 |
| 2010/0231254 A1* | 9/2010 | Lou | ....................... | H03K 17/002 324/756.03 |
| 2011/0057673 A1 | 3/2011 | Iwamoto et al. | | |

FOREIGN PATENT DOCUMENTS

| | | |
|---|---|---|
| JP | 2008-32732 A | 2/2008 |
| JP | 2011-154025 A | 8/2011 |
| WO | 2011/001462 A1 | 1/2011 |

OTHER PUBLICATIONS

Merriam-Webster Dictionary definition of the word Module.*
Office Action issued for counterpart Japanese Application 2012-045889, issued by the Japanese Patent Office on Feb. 24, 2015.
Office Action issued for counterpart Japanese Application 2012-045889, issued by Japan Patent Office on Jun. 23, 2015.

* cited by examiner

*Primary Examiner* — Hyun Park

(57) ABSTRACT

In order to efficiently test a plurality of types of devices under test, provided is a test apparatus that tests a device under test, comprising one or more test modules that each include a plurality of testing sections testing the device under test by exchanging signals with the device under test; and a plurality of control apparatuses that control operation of the testing sections. In each of the one or more test modules, the plurality of testing sections are each allocated to one of the plurality of control apparatuses, and each of the control apparatuses is capable of executing a test program managed by a different user, and controls operation of the testing sections allocated thereto.

7 Claims, 16 Drawing Sheets

| ENTRY NUMBER | SITE NUMBER | CONTEXT NUMBER |
|---|---|---|
| 1 | 1 | 1 |
| 2 | 2 | 1 |
| 3 | 1 | 2 |
| 4 | 0 | 0 |
| 5 | 0 | 0 |
| 6 | 0 | 0 |
| 7 | 0 | 0 |
| 8 | 0 | 0 |
| 9 | 0 | 0 |
| a | 0 | 0 |
| b | 0 | 0 |
| c | 0 | 0 |
| d | 0 | 0 |
| e | 0 | 0 |
| f | 0 | 0 |

*FIG. 8*

| SITE NUMBER | CONTEXT NUMBER | MODULE NUMBER | R/W | LOGICAL ADDRESS | DATA |

FIG. 9

| TEST TARGET | [PHYSICAL PIN NUMBER] 1          9          17         25 |
|---|---|
| | PHYSICAL ADDRESS |
| FIRST DUT | 1 1 1 1 1 1 1 1 0 0 0 0 0 0 0 0 0 0 0 0 0 0 0 0 0 0 0 0 0 0 0 0 |
| SECOND DUT | 0 0 0 0 0 0 0 0 1 1 1 1 1 1 1 1 0 0 0 0 0 0 0 0 0 0 0 0 0 0 0 0 |
| FIRST AND THIRD DUTS | 1 1 1 1 1 1 1 1 0 0 0 0 0 0 0 0 1 1 1 1 1 1 1 1 0 0 0 0 0 0 0 0 |
| FIRST TO FOURTH DUTS | 1 1 1 1 1 1 1 1 1 1 1 1 1 1 1 1 1 1 1 1 1 1 1 1 1 1 1 1 1 1 1 1 |

*FIG. 12*

TEST APPARATUS AND TEST MODULE

BACKGROUND

1. Technical Field

The present invention relates to a test apparatus and a test module.

2. Related Art

A test apparatus that tests a device under test (DUT) includes one or more test modules. Each of the one or more test modules includes a plurality of testing sections. Each testing section is connected to a terminal of the DUT via a transmission line, and tests the DUT by exchanging signals with the DUT.

Furthermore, a test apparatus that tests a plurality of types of DUTs in parallel includes a plurality of site controllers (control apparatuses) that correspond to the types of DUTs. Each control apparatus executes a test program to control operation of the testing sections connected to the corresponding DUT.

Patent Document 1: Japanese Patent Application Publication No. 2011-154025

Patent Document 2: International Publication WO 2011/001462

With such a test apparatus, it is preferable that a plurality of test programs can be debugged by a plurality of users accessing the test apparatus simultaneously via the control apparatuses.

SUMMARY

Therefore, it is an object of an aspect of the innovations herein to provide a test apparatus and a test module, which are capable of overcoming the above drawbacks accompanying the related art. The above and other objects can be achieved by combinations described in the independent claims. The dependent claims define further advantageous and exemplary combinations of the innovations herein. According to a first aspect related to the innovations herein, provided is A test apparatus that tests a device under test, comprising one or more test modules that each include a plurality of testing sections testing the device under test by exchanging signals with the device under test; and a plurality of control apparatuses that control operation of the testing sections. In each of the one or more test modules, the plurality of testing sections are each allocated to one of the plurality of control apparatuses, and each of the control apparatuses is capable of executing a test program managed by a different user, and controls operation of the testing sections allocated thereto. Also provided it the test module included in the test apparatus.

The summary clause does not necessarily describe all necessary features of the embodiments of the present invention. The present invention may also be a sub-combination of the features described above.

BRIEF DESCRIPTION OF THE DRAWINGS

FIG. 8 shows exemplary identification information stored in an assignment storage section 62.

FIG. 9 shows an exemplary format of the command transmitted from the control apparatus 18 to the test module 20.

FIG. 12 shows exemplary candidates for a physical address identifying DUTs 300 to be test targets, stored in the DUT map table 68.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
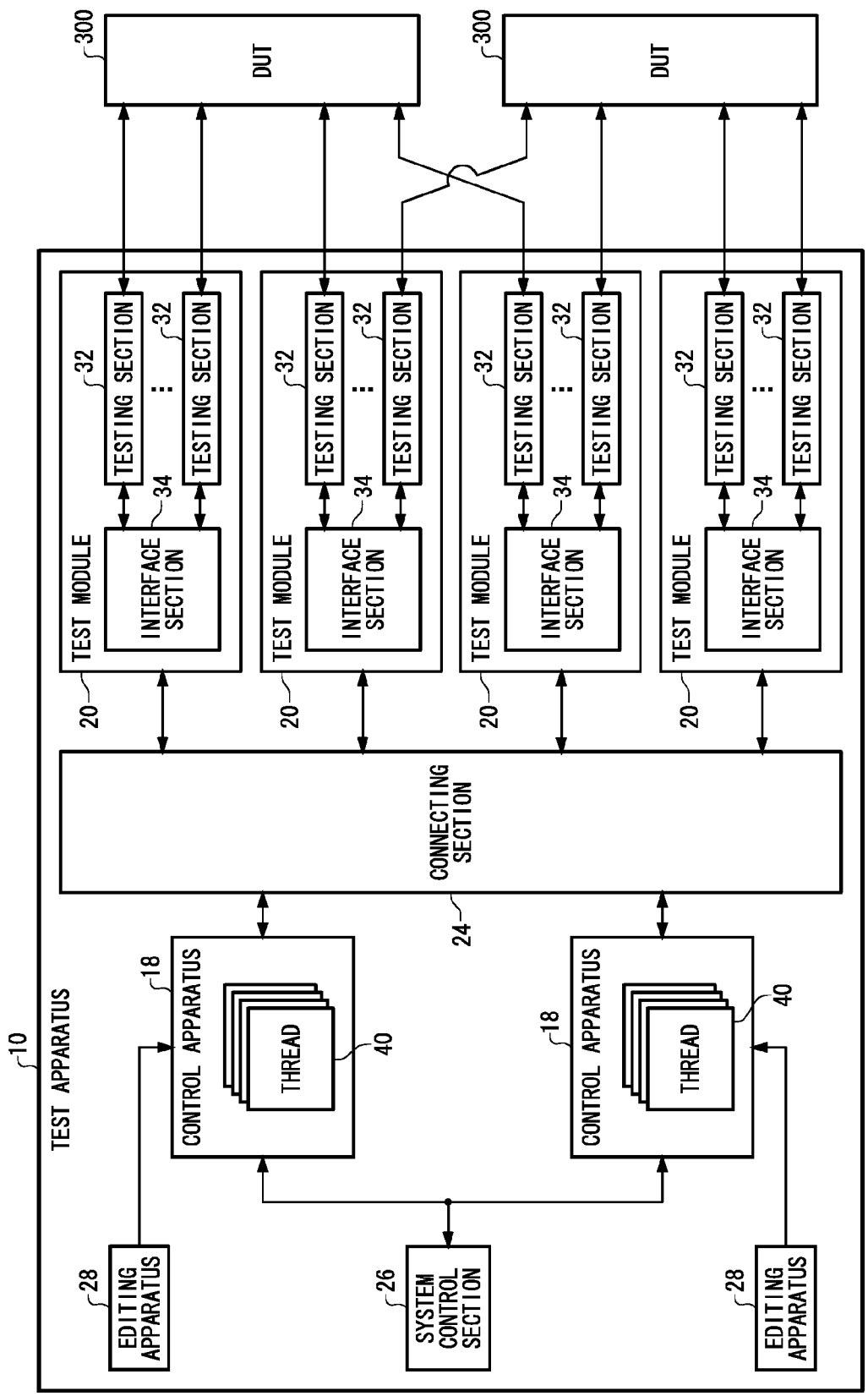
FIG. 1 shows a configuration of a test apparatus 10 according to an embodiment of the present invention, along with a plurality of DUTs 300.

FIG. 1 shows a configuration of a test apparatus 10 according to an embodiment of the present invention, along with a plurality of DUTs 300. The test apparatus 10 of the present embodiment tests at least one device under test (DUT) 300.

For example, the test apparatus 10 may test one DUT 300, or may test a plurality of the same type of DUTs 300 in parallel. Furthermore, the test apparatus 10 may test a plurality of different types of DUTs 300 at the same time.

The test apparatus 10 includes a plurality of control apparatuses 18, a plurality of test modules 20, a connecting section 24, a system control section 26, and a plurality of editing apparatuses 28. If only one type of DUT 300 is being tested, the test apparatus 10 may include one control apparatus 18 instead of a plurality of control apparatuses 18.

Each control apparatus 18 executes a test program to test the corresponding DUT 300. Each control apparatus 18 corresponds to a type of DUT 300. The control apparatuses 18 execute a plurality of threads 40 in parallel. Each control apparatus 18 executes one thread 40 in association with one test program. Accordingly, each control apparatus 18 can execute a plurality of test programs in parallel by executing a plurality of the threads 40.

Each test module 20 is a substrate attached within a test head, for example. Each test module 20 includes a plurality of testing sections 32 and an interface section 34.

Each testing section 32 is connected to a terminal of one of the DUTs 300. Each testing section 32 tests the DUT 300 by exchanging signals with the terminal of the DUT 300 to which the testing section 32 is connected.

Each testing section 32 is assigned to one of the threads 40 of one of the control apparatuses 18. Each testing section 32 is controlled by the assigned thread 40. Each testing section 32 is connected to the DUT 300 corresponding to the control apparatus 18 to which the testing section 32 is assigned. In other words, each testing section 32 is controlled by the test program corresponding to the thread 40 of the control apparatus 18 to which the testing section 32 is assigned, and tests the DUT 300 corresponding to the control apparatus 18 by exchanging signals with the DUT 300.

The testing sections 32 within a single test module 20 may be connected to different types of DUTs 300. Furthermore, each DUT 300 may be connected to a different test module 20.

Each interface section 34 receives a command signal from a control apparatus 18. The interface section 34 accesses the testing section 32 assigned to a thread 40 of the control apparatus 18 that sent the command, according to the received command. More specifically, upon receiving the command, the interface section 34 writes the data contained in the command to an internal register of a testing section 32 designated by the command. The testing section 32 performs an operation corresponding to the written data, in response to having data written to an internal register thereof.

When a read command is received, the interface section 34 reads data from the internal register of the testing section 32 designated by the command. The interface section 34 transmits a message including the read data to the thread 40 of the control apparatus 18 that was the source of the command transmission.

The connecting section 24 connects the control apparatuses 18 to the test modules 20. For example, the connecting section 24 may be a switch controller that switches the connections between the control apparatuses 18 and the test modules 20.

The system control section 26 is connected to each of the control apparatuses 18, and controls the overall test apparatus 10. A universal or specialized high-speed serial bus, for example, may be used to connect the system control section 26 to the control apparatuses 18.

Each editing apparatus 28 corresponds to a control apparatus 18. Each editing apparatus 28 enables a user to edit the test programs executed by the corresponding control apparatus 18. Each editing apparatus 28 may enable the user to edit the execution order of the test programs executed by the control apparatus 18, for example.

The control apparatuses 18 execute the test programs for testing the DUTs 300 in parallel, in order to control in parallel the operation of the testing sections 32 assigned to the respective test programs. More specifically, each control apparatus 18 executes a plurality of threads 40 in parallel, to execute one test program corresponding to each of the threads 40. The testing sections 32 controlled by the control apparatuses 18 in this manner exchange signals in parallel with the DUTs 300 to test the DUTs 300.

In this case, each control apparatus 18 executes a plurality of test programs in parallel to perform testing independently of each other. In other words, each control apparatus 18 executes test programs in parallel for performing tests that do not depend on each other. Therefore, when performing a plurality of tests on a DUT 300, the test apparatus 10 can decrease the testing time.

Each control apparatus 18 is capable of executing a test program managed by a different user, to control the operation of the testing sections 32 assigned thereto. Therefore, the test apparatus 10 enables the executed test programs to be edited for individual users via corresponding control apparatuses 18 using corresponding editing apparatuses 28.

Figure 2:
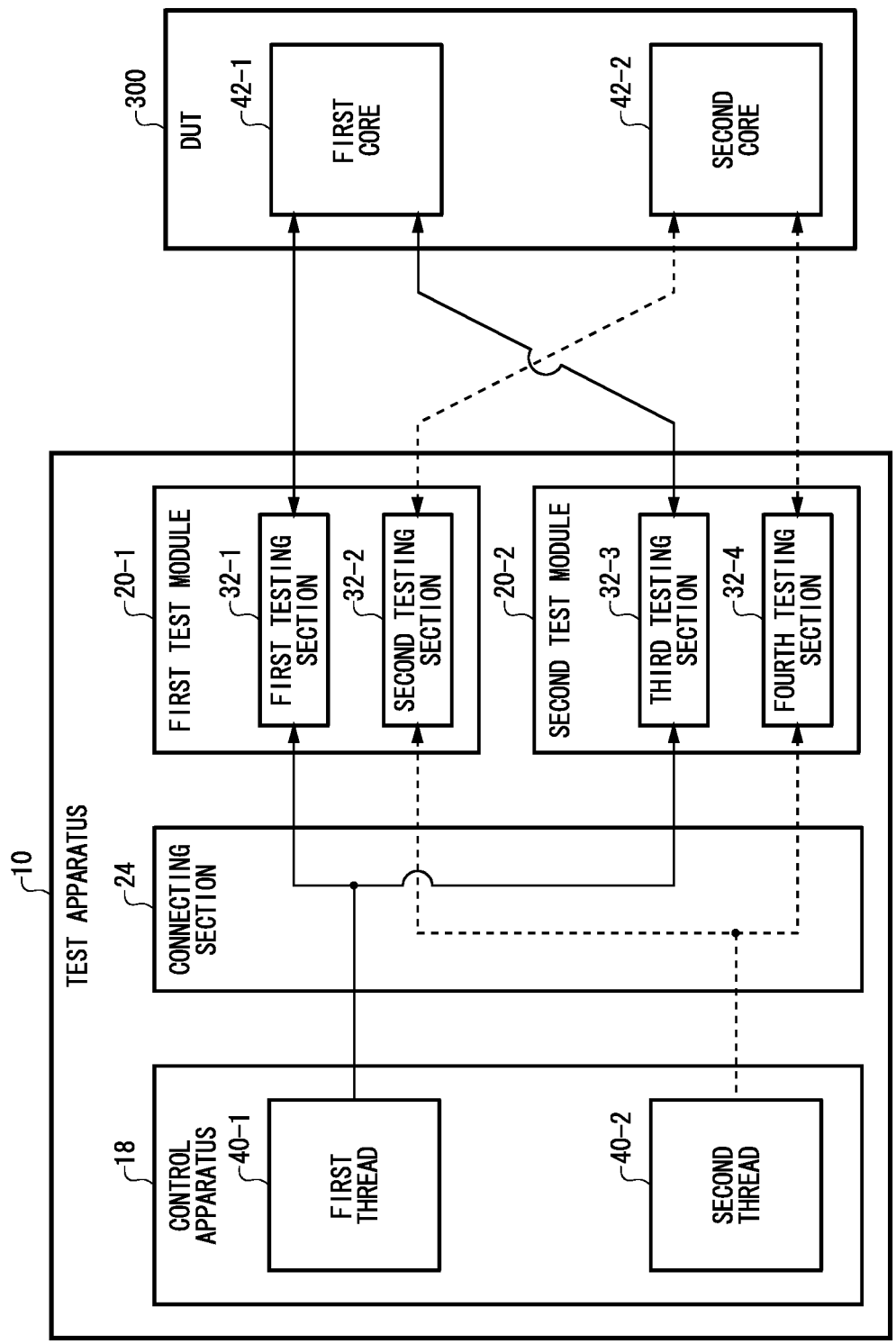
FIG. 2 shows an exemplary control flow within a test apparatus 10 and an exemplary signal flow between the test apparatus 10 and a DUT 300, when parallel tests are executed.

FIG. 2 shows an exemplary control flow within a test apparatus 10 and an exemplary signal flow between the test apparatus 10 and a DUT 300, when parallel tests are executed. The DUT 300 may include a first core 42-1 and a second core 42-2 that respectively realize different circuit functions. The test apparatus 10 performs independent tests, which do not depend on each other, respectively on the first core 42-1 and the second core 42-2.

The first test module 20-1 includes a first testing section 32-1 and a second testing section 32-2, for example. The second test module 20-2 includes a third testing section 32-3 and a fourth testing section 32-4, for example.

The control apparatus 18 executes in parallel a first thread 40-1 corresponding to a test program for testing the first core 42-1 and a second thread 40-2 corresponding to a test program for testing the second core 42-2. Therefore, the control apparatus 18 can execute a plurality of programs for testing the DUT 300 in parallel using a plurality of threads 40.

The first testing section 32-1 and third testing section 32-3 are assigned to the first thread 40-1 and connected to the first core 42-1. The second testing section 32-2 and fourth testing section 32-4 are assigned to the second thread 40-2 and connected to the second core 42-2.

In this example, the first thread 40-1 transmits commands respectively to the first testing section 32-1 and the third testing section 32-3, to control the operations thereof. The second thread 40-2 transmits commands respectively to the second testing section 32-2 and the fourth testing section 32-4, to control the operations thereof. In this way, the control apparatus 18 can control in parallel the testing sections 32 corresponding to the plurality of test programs. The testing sections 32 can test the DUT 300 by exchanging signals in parallel with the DUT 300.

Figure 3:
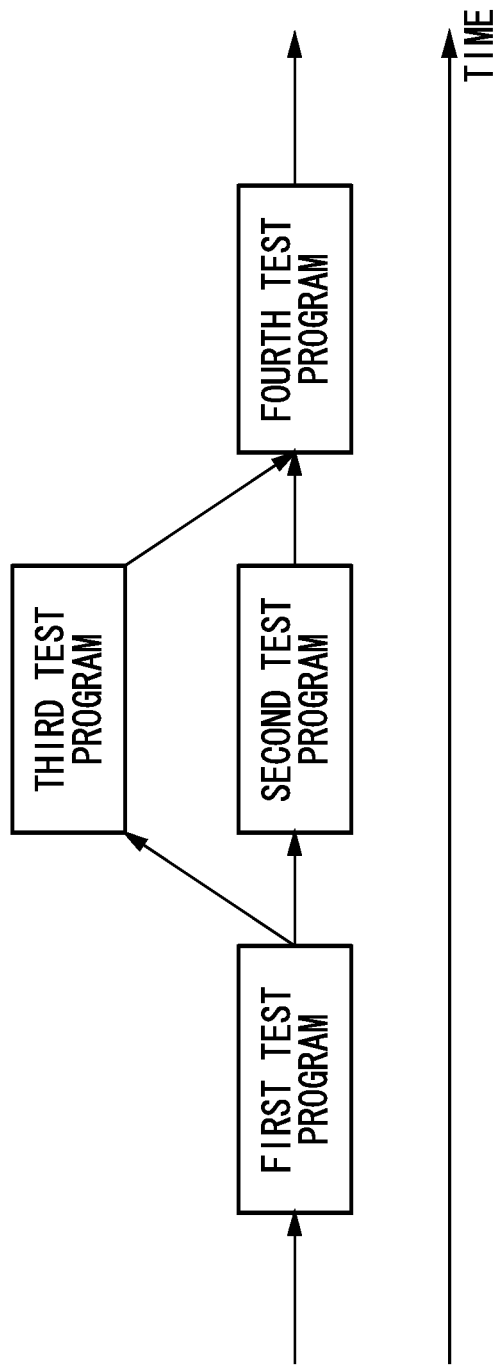
FIG. 3 shows an exemplary execution order of test programs when parallel testing is performed.

FIG. 3 shows an exemplary execution order of test programs when parallel testing is performed. For example, the test apparatus 10 may test the DUT 300 by executing first to fourth test programs. Furthermore, in this case, the second test program and the third test program are completely independent of each other.

In this case, the control apparatus 18 executes the thread 40 corresponding to the second test program and the thread 40 corresponding to the third test program in parallel. In this way, as shown in FIG. 3, the test apparatus 10 can perform the test using the second test program and the test using the third test program in parallel. Accordingly, the test apparatus 10 can decrease the testing time.

Figure 4:
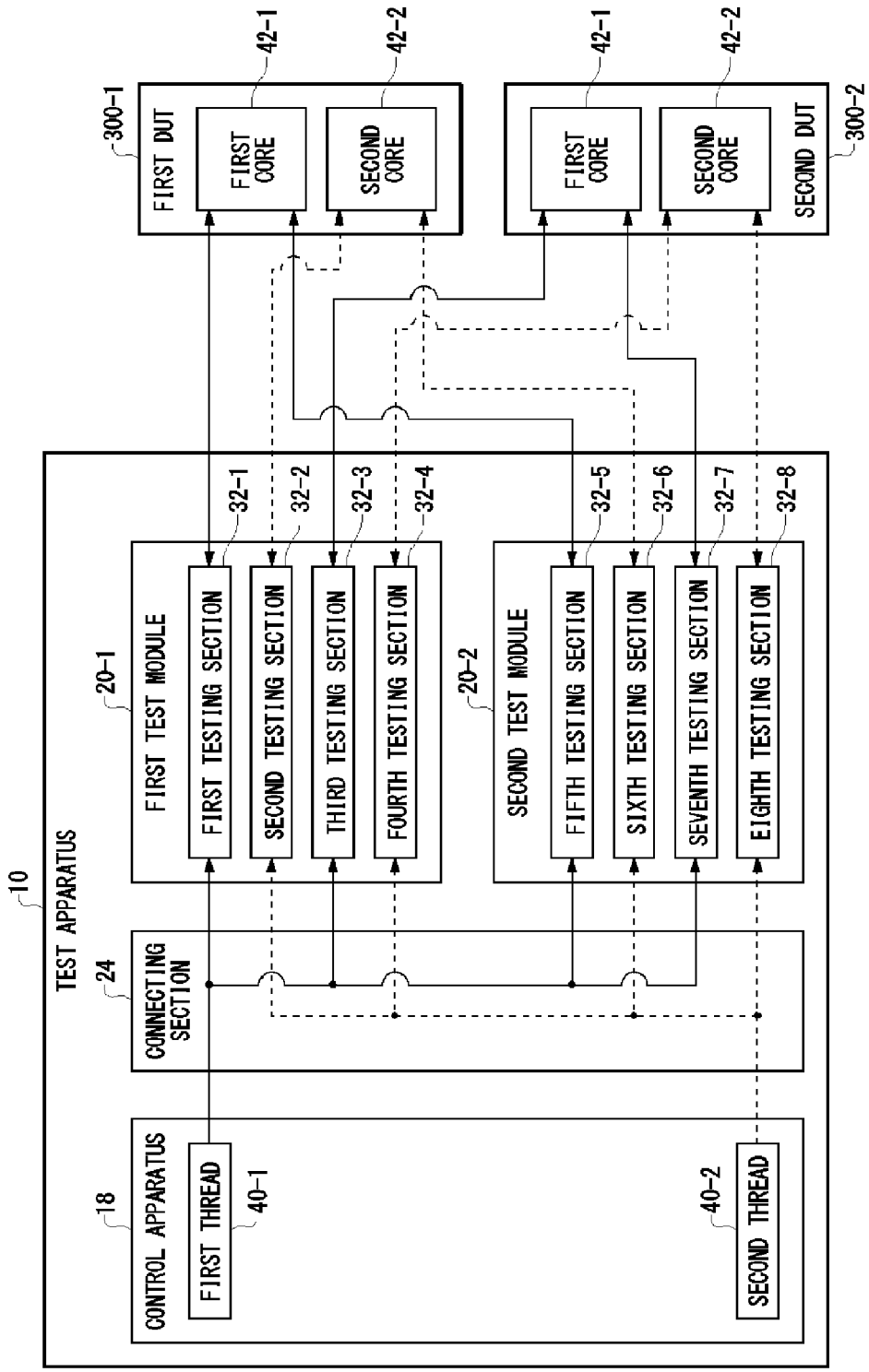
FIG. 4 shows an exemplary control flow in a test apparatus 10 and exemplary signal flow between the test apparatus 10 and DUTs 300, when testing is performed in parallel on DUTs 300 of the same type.

FIG. 4 shows an exemplary control flow in a test apparatus 10 and exemplary signal flow between the test apparatus 10 and DUTs 300, when testing is performed in parallel on DUTs 300 of the same type. The test apparatus 10 may test a first DUT 300-1 and a second DUT 300-2, which are the same type, at the same time.

The first DUT 300-1 and the second DUT 300-2 each include a first core 42-1 and a second core 42-2, which realize different circuit functions. The test apparatus 10 performs parallel tests, which are independent of each other, respectively on the first core 42-1 and the second core 42-2 in each of the first DUT 300-1 and the second DUT 300-2.

The first test module 20-1 includes first to fourth testing sections 32-1 to 32-4, for example. The second test module 20-2 includes fifth to eighth testing sections 32-5 to 32-8, for example.

The control apparatus 18 executes, in parallel, a first thread 40-1 corresponding to a test program for testing the first core 42-1 and a second thread 40-2 corresponding to a test program for testing the second core 42-2, for example. In this way, the control apparatus 18 can execute in parallel, using a plurality of threads 40, a plurality of test programs for respectively testing the first DUT 300-1 and the second DUT 300-2.

The first testing section 32-1 and the fifth testing section 32-5 are assigned to the first thread 40-1 and connected to the first core 42-1 of the first DUT 300-1. The third testing section 32-3 and the seventh testing section 32-7 are assigned to the first thread 40-1 and connected to the first core 42-1 of the second DUT 300-2.

The second testing section 32-2 and the sixth testing section 32-6 are assigned to the second thread 40-2 and connected to the second core 42-2 of the first DUT 300-1. The fourth testing section 32-4 and the eighth testing section 32-8 are assigned to the second thread 40-2 and connected to the second core 42-2 of the second DUT 300-2.

In this example, the first thread 40-1 transmits commands respectively to the first testing section 32-1, the third testing section 32-3, the fifth testing section 32-5, and the seventh testing section 32-7 to control the operations thereof. The second thread 40-2 transmits commands respectively to the second testing section 32-2, the fourth testing section 32-4, the sixth testing section 32-6, and the eighth testing section 32-8 to control the operations thereof.

In this way, the control apparatus 18 can test the first DUT 300-1 and the second DUT 300-2 at the same time. Furthermore, the control apparatus 18 can control in parallel the testing sections 32 corresponding to the test programs. The testing sections 32 can perform testing by exchanging signals with the first DUT 300-1 and the second DUT 300-2 in parallel.

Figure 5:
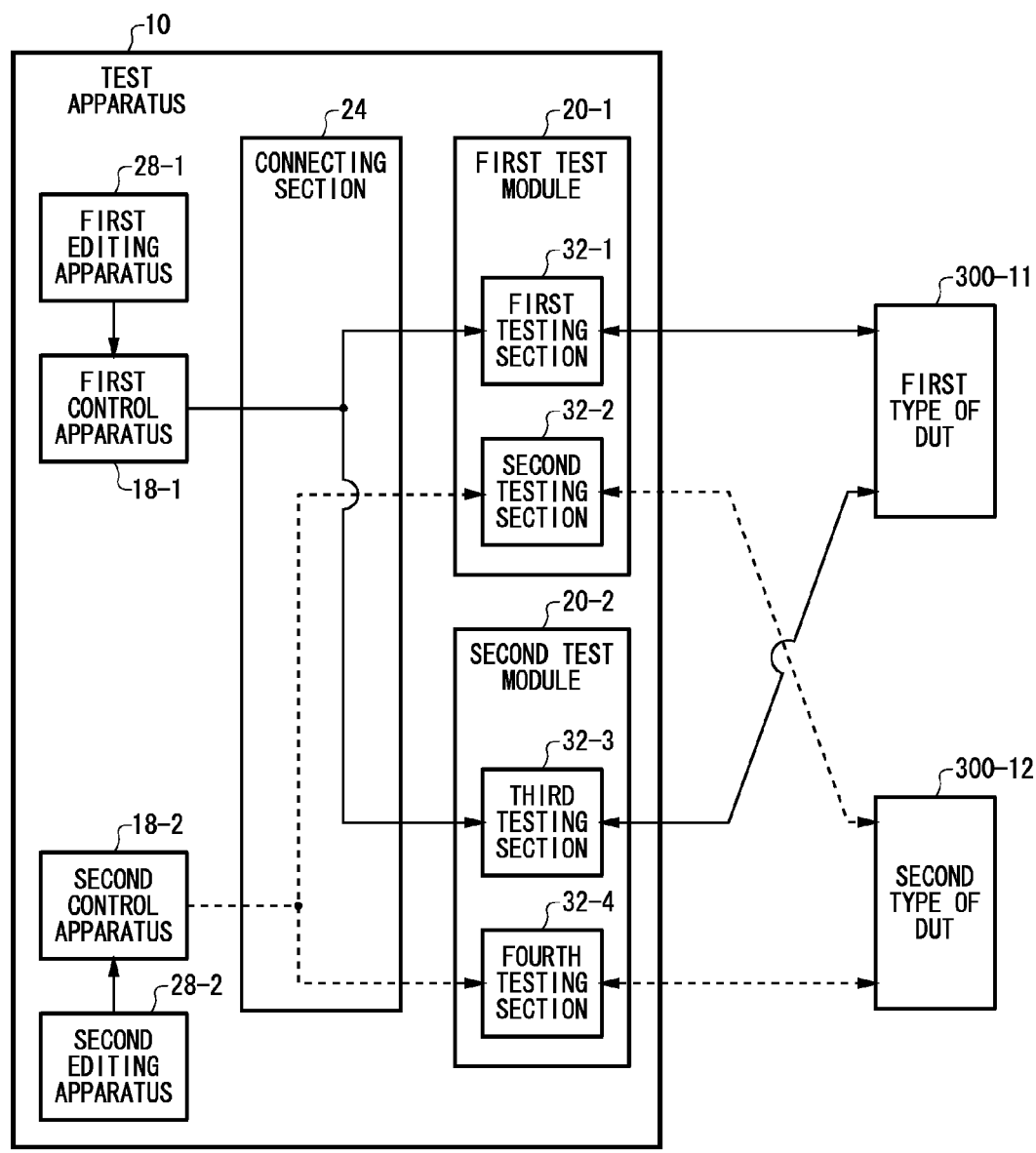
FIG. 5 shows an exemplary control flow in a test apparatus 10 and exemplary signal flow between the test apparatus 10 and DUTs 300, when parallel testing is performed in parallel on DUTs 300 of different types.

FIG. 5 shows an exemplary control flow in a test apparatus 10 and exemplary signal flow between the test apparatus 10 and DUTs 300, when parallel testing is performed in parallel on DUTs 300 of different types. The test apparatus 10 may test a plurality of DUTs 300 of different types at the same time.

The test apparatus 10 tests a first type of DUT 300-11 and a second type of DUT 300-12 at the same time, for example. In this case, the test apparatus 10 includes a first control apparatus 18-1 corresponding to the first type of DUT 300-11 and a second control apparatus 18-2 corresponding to the second type of DUT 300-12.

The first test module 20-1 includes a first testing section 32-1 and a second testing section 32-2, for example. The second test module 20-2 includes a third testing section 32-3 and a fourth testing section 32-4, for example.

The first testing section 32-1 and the third testing section 32-3 are assigned to the first control apparatus 18-1 and connected to the first type of DUT 300-11. The second testing section 32-2 and the fourth testing section 32-4 are assigned to the second control apparatus 18-2 and connected to the second type of DUT 300-12.

In this example, the first control apparatus 18-1 transmits commands respectively to the first testing section 32-1 and the third testing section 32-3 to control the operations thereof. The second control apparatus 18-2 transmits commands respectively to the second testing section 32-2 and the fourth testing section 32-4 to control the operations thereof.

In this way, the first control apparatus 18-1 and the second control apparatus 18-2 can perform two test programs in parallel for testing the first type of DUT 300-11 and the second type of DUT 300-12 in parallel, and can control the operations of the plurality of testing sections 32 corresponding to these two test programs at the same time. The testing sections 32 can exchange signals with the first type of DUT 300-11 and the second type of DUT 300-12 in parallel, and can therefore test the first type of DUT 300-11 and the second type of DUT 300-12 at the same time.

Figure 6:
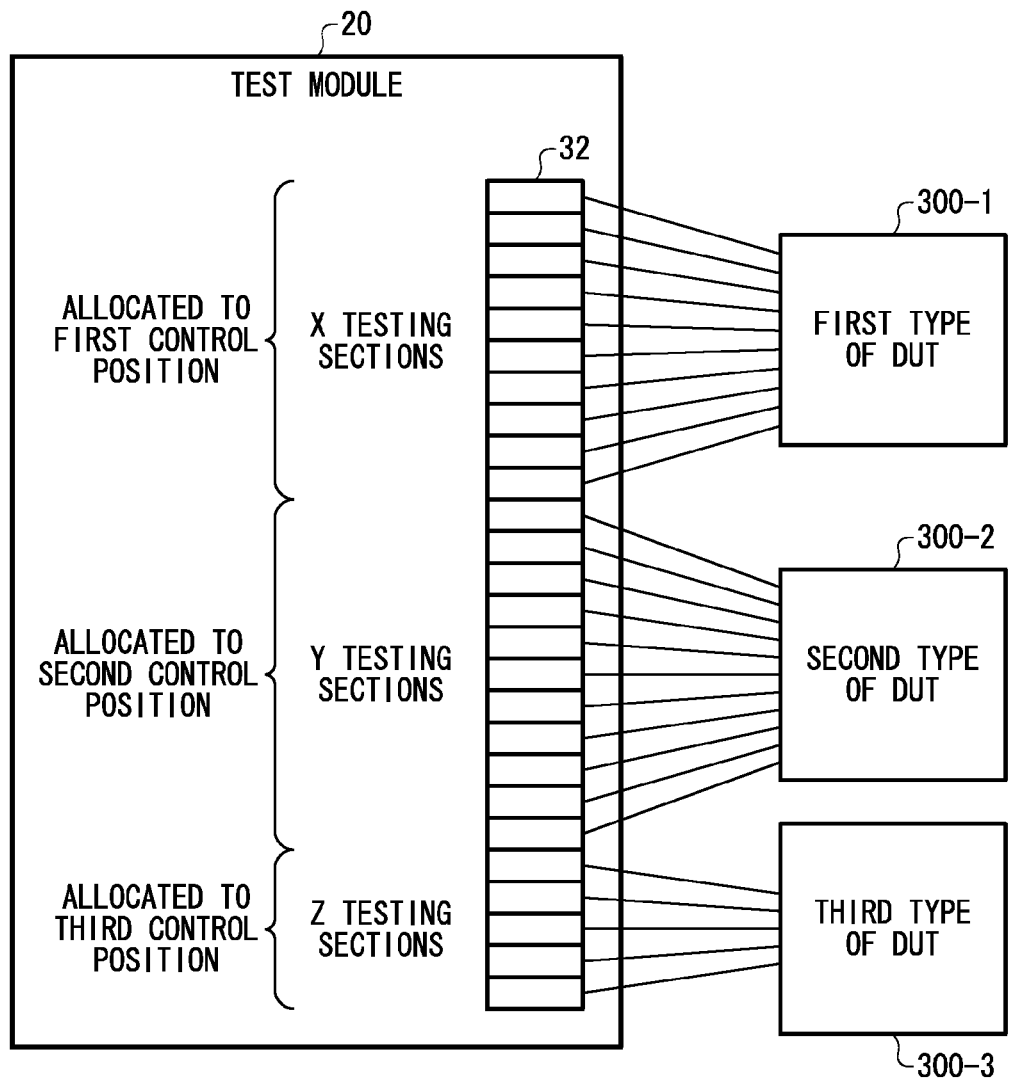
FIG. 6 shows an exemplary assignment of testing sections 32 in a single test module 20 to control apparatuses 18, when three types of DUTs 300 are tested in parallel.

FIG. 6 shows an exemplary assignment of testing sections 32 in a single test module 20 to control apparatuses 18, when three types of DUTs 300 are tested in parallel. Each testing section 32 in a single test module 20 may be assigned to a different control apparatus 18.

In this case, each testing section 32 in a single test module 20 is connected to one of a plurality of different types of DUTs 300. As a result, each of the control apparatuses 18 can perform testing using different testing sections 32 in the same test module 20 as test resources.

Figure 7:
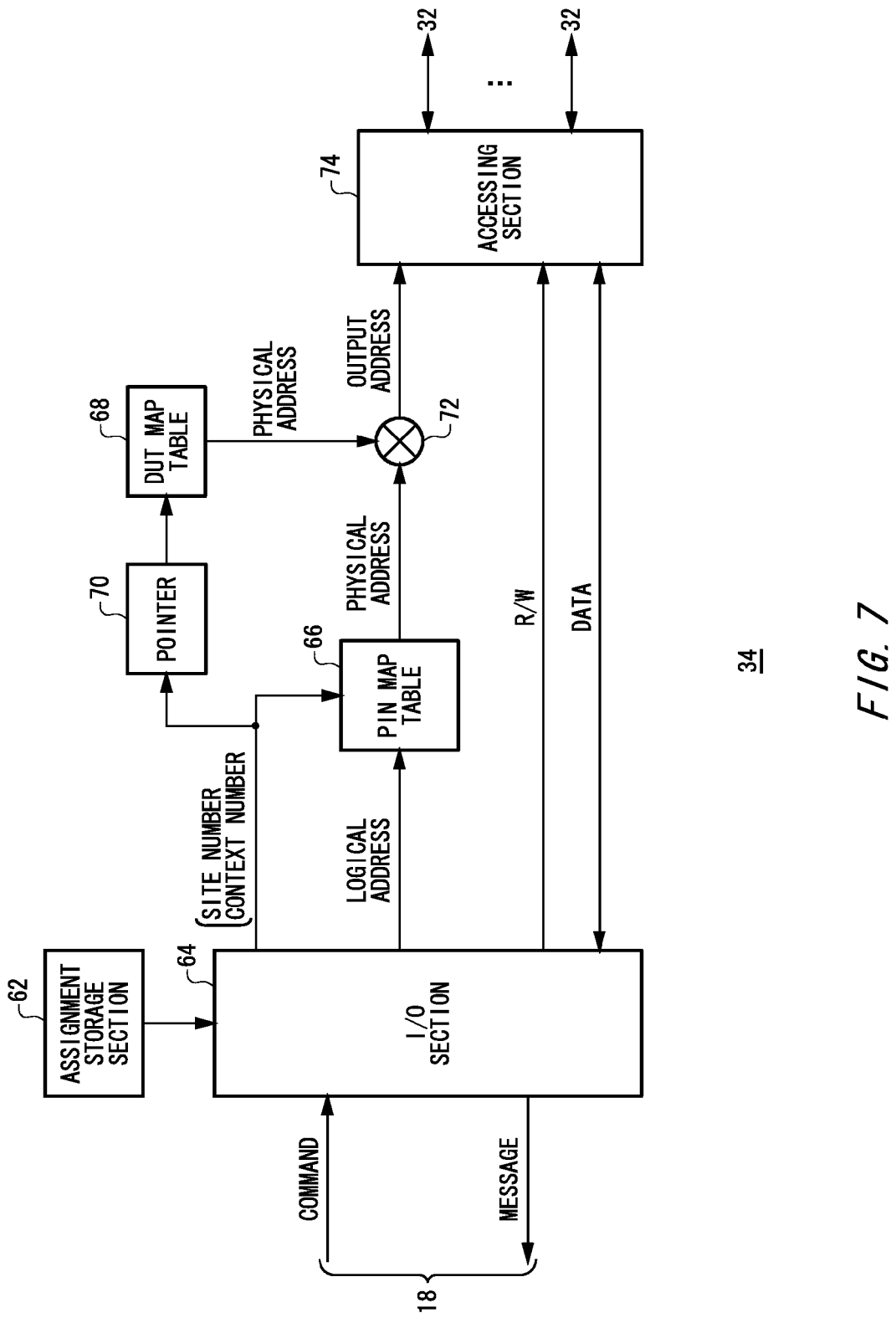
FIG. 7 shows a configuration of an interface section 34 according to the present embodiment.

FIG. 7 shows a configuration of an interface section 34 according to the present embodiment. The interface section 34 includes an assignment storage section 62, an input/output section 64, a pin map table 66, a DUT map table 68, a pointer storage section 70, an AND circuit 72, and an accessing section 74.

The assignment storage section 62 stores identification information indicating sets of a control apparatus 18 and a thread 40 to which the testing sections 32 of the test module 20 are assigned. Prior to execution of the test programs, identification information is written exclusively to the assignment storage section 62 by the corresponding control apparatus 18. An example of the identification information stored in the assignment storage section 62 is provided with reference to FIG. 8.

The input/output section 64 receives a command sent from the control apparatus 18. Furthermore, the input/output section 64 transmits, to the corresponding control apparatus 18, a message containing the data read from the testing section 32. The input/output section 64 acquires only the command sent from the control apparatuses 18 and the threads 40 to which the testing sections 32 of the test module are assigned, from among the received commands.

The input/output section 64 supplies the pin map table 66 with the logical address contained in the acquired command. The input/output section 64 supplies the pin map table 66 and the DUT map table 68 with the site number and context number contained in the acquired command. A detailed description of the command content and the process performed by the input/output section 64 is provided with reference to FIG. 9.

The pin map table 66 stores a connection relationship between each terminal of the DUT 300 and the testing sections 32 of the test module 20. Upon receiving the logical address, the pin map table 66 references the connection relationship and outputs a physical address that identifies one or more testing sections 32 connected to the terminal of the DUT 300 indicated by the logical address.

The pin map table 66 records the connection relationship, i.e. the type of the connected DUT 300, for each control apparatus 18, and may output a physical address by switching the connection relationship referenced for each control apparatus 18 that receives a command. Furthermore, the pin map table 66 stores the connection relationship for each thread 40, and may output a physical address by switching the connection relationship referenced for each thread 40 that sends a command. The pin map table 66 is described in further detail with reference to FIGS. 10 and 11.

The DUT map table 68 outputs a physical address that identifies the testing sections 32 connected to the terminal of the DUT 300 that is a target for testing, in the DUT 300 connected to the test module 20. For example, the DUT map table 68 may store a plurality of candidates for physical addresses identifying one or more terminals of one or more DUTs 300 (referred to simply as a "DUT map") to be test targets. Each of the candidates in the DUT map stored by the DUT map table 68 corresponds to a set of a site number and a context number. The DUT map table 68 outputs the DUT map corresponding to the set of the site number and the context number contained in the command acquired by the input/output section 64, from among the candidates. More specifically, the DUT map table 68 stores a plurality of candidates for physical addresses that identify testing sections 32 connected to the DUT 300 serving as the test target, and outputs the physical address designated by a pointer stored in the pointer storage section 70. A further description of the DUT map table 68 is provided with reference to FIG. 12.

The pointer storage section 70 stores pointers that designate DUT maps to be output, from among the candidate DUT maps stored by the DUT map table 68. The pointer storage section 70 stores a pointer for each control apparatus 18, i.e. for each type of connected DUT 300, and may switch the pointer and output a DUT map for each control apparatus 18 that has received a command. Furthermore, the pointer storage section 70 stores a pointer for each set of a control apparatus 18 and a thread 40, and may perform output by switching the pointer to the set of a thread 40 and a control apparatus 18 that has received a command, according to the set of a site number and a context number contained in the command. As a result, the pointer storage section 70 can switch to a set of a control apparatus 18 and a thread 40 to output, from the DUT map table 68, a DUT map indicating a terminal of the DUT 300 to serve as a test target. Prior to the execution of the test programs, each pointer is written to the pointer storage section 70 by the corresponding control apparatus 18. Furthermore, prior to the execution of the test programs, information indicating the correspondence between the sets of a site number and a context number and the corresponding pointers (or DUT maps) is written to the pointer storage section 70 from the corresponding control apparatus 18. This information may be set in the control apparatuses 18 by a user, for example.

The AND circuit 72 outputs physical addresses that identify only the testing sections 32 corresponding to terminals designated by the DUT map output from the DUT map table 68, from among the one or more testing sections 32 designated by the physical addresses output from the pin map table 66. More specifically, the AND circuit 72 calculates, for each bit, the AND of the physical addresses output from the pin map table 66, i.e. the physical addresses identifying testing sections 32 connected to terminals that are control targets, and the physical addresses output from the DUT map table 68, i.e. physical addresses indicating testing sections 32 connected to the DUTs 300 that are test targets. In this way, during testing, the AND circuit 72 can output physical addresses indicating testing sections 32 that are to exchange signals with the DUTs 300. Furthermore, the DUT 300 that is a test target can be switched for each thread 40. The AND circuit 72 supplies the accessing section 74 with the calculation results, as an output address. A description of an exemplary process performed by the AND circuit 72 is provided with reference to FIG. 13.

The accessing section 74 accesses the testing section 32 identified by the output address from the AND circuit 72, in response to the command acquired by the input/output section 64. For example, the accessing section 74 may write the data contained in the command acquired by the input/output section 64 to the internal register in the testing section 32 identified by the output address from the AND circuit 72. In this way, a testing section 32 having data written to the internal register therein can perform an operation corresponding to the written data.

When the command acquired by the input/output section 64 is a read command, the accessing section 74 reads data from the testing section 32 designated by the output address from the AND circuit 72. The accessing section 74 then returns the read data to the input/output section 64. When the acquired command is a read command, the input/output section 64 transmits the message containing the data received from the accessing section 74 back to the control apparatus 18 that sent the command.

In the manner described above, the interface section 34 can acquire the commands sent from the control apparatus 18. The interface section 34 can then access the testing section 32 assigned to the thread 40 of the control apparatus 18 that sent the acquired command, according to the acquired command.

The interface section 34 can access testing sections 32 testing one or more devices under test corresponding to sets of a site number and a context number, from among one or more devices under test designated as test targets by the received command, using the DUT map table 68, the pointer storage section 70, and the AND circuit 72. In other words, the interface section 34 masks access to devices under test other than the one or more devices under test corresponding to sets of a site number and a context number, from among one or more devices under test designated as test targets by the received command. The interface section 34 may perform the above operations in both parallel testing and overlapping testing.

FIG. 8 shows exemplary identification information stored in an assignment storage section 62. The assignment storage section 62 may have a plurality of entries storing identification information, for example.

A site number is allocated to each of the control apparatuses 18 to distinguish the control apparatus 18 from other control apparatuses 18. A context number is allocated to each of the threads 40 executed by each control apparatus 18, to identify the thread 40 from other threads 40 within the control apparatus 18.

The identification information is expressed by a set of a site number for identifying a control apparatus 18 and a context number for identifying a thread 40. Each entry of the assignment storage section 62 stores identification information expressed by such a set of a site number and a context number.

Prior to the execution of a thread 40 corresponding to a new test program, each control apparatus 18 writes the identification information, i.e. the set of a site number and a context number, for identifying the control apparatus 18 and the thread 40 to the assignment storage section 62 of each test module 20 having a testing section 32 controlled by the thread 40, i.e. a testing section 32 used as a resource. In this case, each control apparatus 18 sequentially accesses the corresponding assignment storage section 62 from the first entry to find an empty entry, and stores the identification information in the first empty entry found.

Each control apparatus 18 exclusively accesses the corresponding assignment storage section 62, and stores the identification information therein. Furthermore, when the execution of a thread 40 corresponding to a test program is finished, each control apparatus 18 deletes the identification information for identifying this thread 40 and control apparatus 18 from the entry in the assignment storage section 62. As a result, the interface section 34 can prevent the same testing section 32 from being used simultaneously by two or more different threads 40.

FIG. 9 shows an exemplary format of the command transmitted from the control apparatus 18 to the test module 20. Each control apparatus 18 generates a command with a format such as shown in FIG. 9, and transmits the command to the corresponding test modules 20.

The command may include a site number, a context number, a module number, a R/W flag, a logical address, and data, for example. The site number identifies the control apparatus 18 that transmitted the command. The context number identifies the thread 40 that sent the command in the control apparatus 18. The module number identifies the test module 20 that is the transmission source of the command.

The R/W flag identifies whether the command is a read command or a write command. The logical address is information designating locations of one or more terminals of a DUT 300, and indicates the testing sections 32 to be controlled by the command. The data is information such as the commands to be provided to the testing sections 32 connected to the terminals designated by the logical address. This data is written to the internal registers of the testing sections 32 connected to the terminals designated by the logical address.

The input/output section 64 of each test module 20 receives such a command from a control apparatus 18. When a command is received, the input/output section 64 judges whether the module number contained in the received command matches the module number of the test module 20 that includes this input/output section 64. The input/output section 64 discards the received command if the module numbers do not match.

If the module numbers match, the input/output section 64 judges whether the set of the site number and context number contained in the received command matches one of the pieces of identification information, i.e. one of the sets of a site number and a context number, stored in the entries of the assignment storage section 62. The input/output section 64 discards the received command if the sets of site number and context number do not match.

If the sets of a site number and context number do match, the input/output section 64 acquires the received command. In this way, the input/output section 64 can acquire the command when the command is received from a thread 40 and control apparatus 18 to which are assigned one of the testing sections 32 of the test module 20. In other words, the input/output section 64 can discard the command when the command is received from a control apparatus 18 and thread 40 that are not assigned thereto.

The input/output section 64 supplies the pin map table 66 with the logical address, the site number, and the context number contained in the acquired command. The input/output section 64 supplies the accessing section 74 with the R/W flag. The input/output section 64 supplies the DUT map table 68 with the site number and the context number contained in the acquired command.

Figure 10:
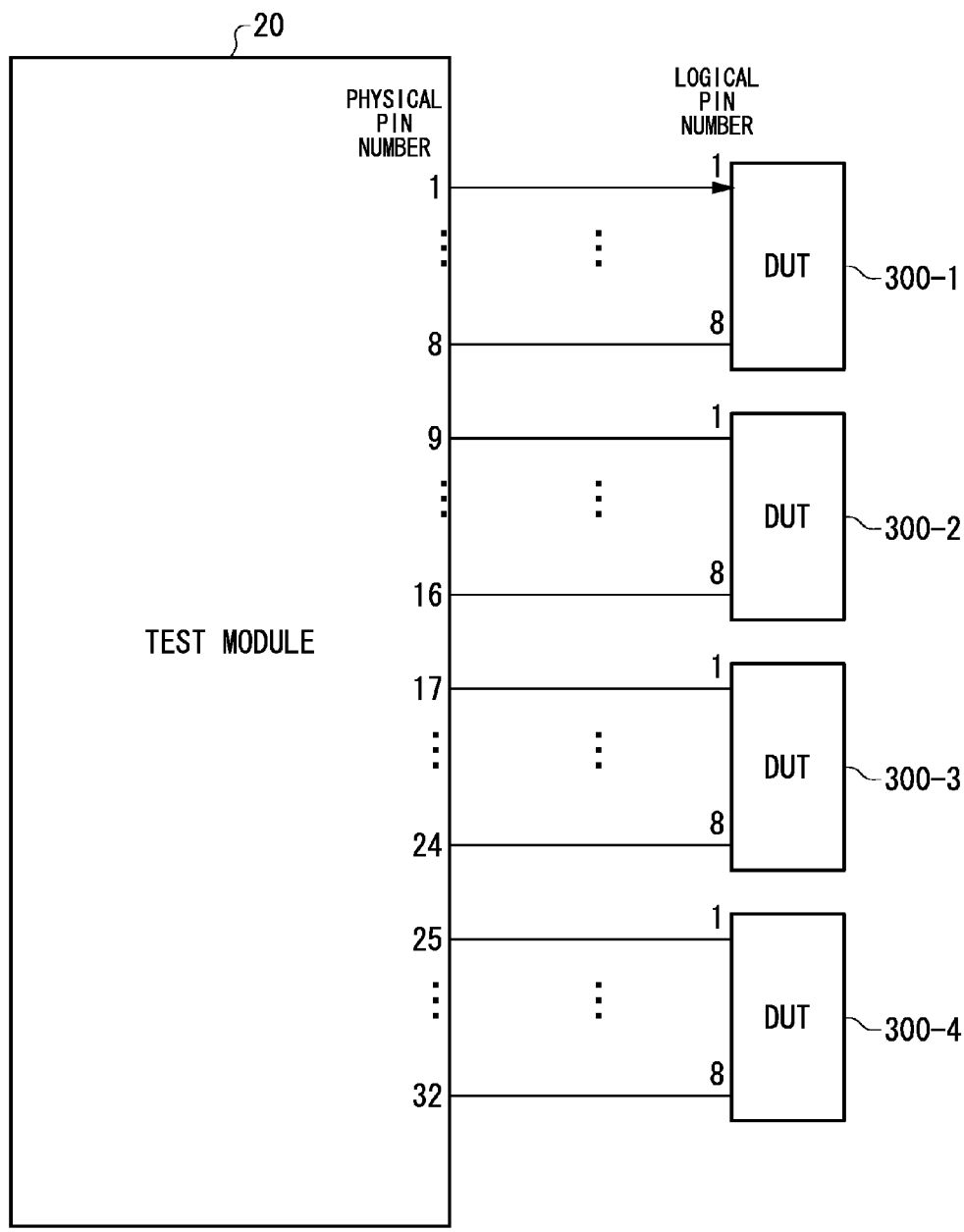
FIG. 10 shows an exemplary connection between a test module 20 and four DUTs 300.

FIG. 10 shows an exemplary connection between a test module 20 and four DUTs 300. In the example shown in FIG. 10, each of the terminals of the DUTs 300 connected to the one test module 20 is connected to a pin corresponding to a different one of the testing sections 32 in the test module 20.

A logic pin number is allocated to each terminal of the DUTs 300. The logical address is information designating one or more of the logic pin numbers.

A physical pin number is allocated to each testing section 32 of the test module 20. The physical address is information designating one or more of the physical pins.

The pin map table 66 stores connection information between the terminals of the DUTs 300 and the testing sections 32 of the test module 20. For example, as shown in FIG. 10, when simultaneously testing four DUTs 300 that each have eight terminals, the pin map table 66 stores information indicating that the first, ninth, seventeenth, and twenty-fifth pins (physical pin number=1, 9, 17, 25) of the test module are connected to the first terminals (logical pin number=1) of the DUTs 300. Furthermore, the pin map table 66 stores information indicating that the second, tenth, eighteenth, and twenty-sixth pins (physical pin number=2, 10, 18, 26) of the test module are connected to the second terminals (logical pin number=2) of the DUTs 300. Similarly, the pin map table 66 stores the connection relationship for the third to eighth terminals of the DUT 300.

Figure 11:
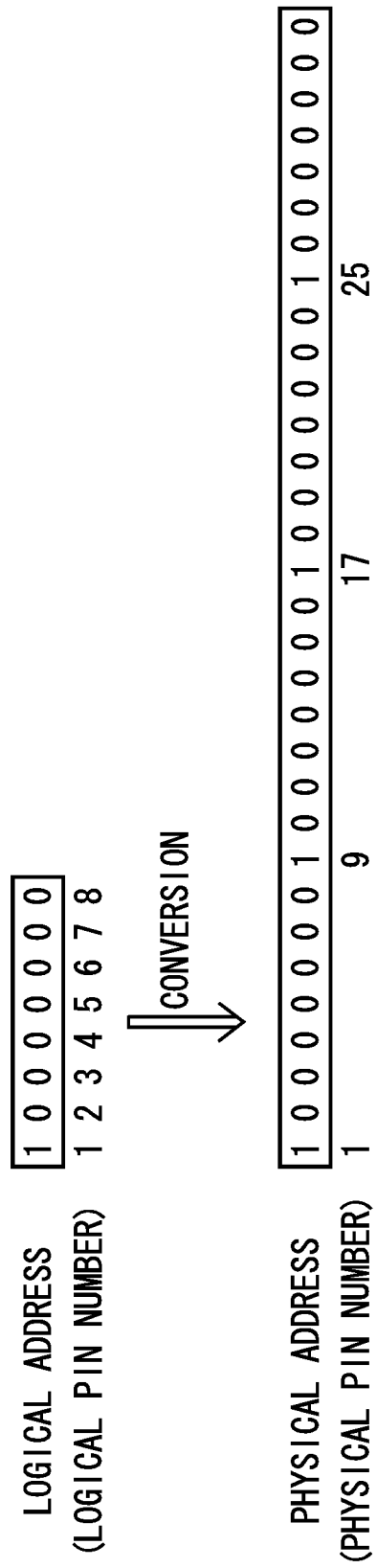
FIG. 11 shows an exemplary conversion from a logical address to a physical address performed by the pin map table 66.

FIG. 11 shows an exemplary conversion from a logical address to a physical address performed by the pin map table 66. Upon receiving the logical address from the input/output section 64, the pin map table 66 references the connection relationship between the testing sections 32 and the terminals of the DUT 300, and converts this logical address into a physical address.

Specifically, in response to receiving a logical address, the pin map table 66 outputs a physical address identifying one or more testing sections 32 that are connected to the terminal of the DUT 300 identified by the logical address. As a result, the pin map table 66 can output a physical address identifying testing sections 32 connected to a terminal designated as a control target by the acquired command.

For example, as shown in FIG. 11, it may be assumed that the pin map table 66 receives a logical address identifying the first terminal of the DUT 300. In this case, the DUT map table 68 converts the received logical address into a physical address identifying all of the testing sections 32 connected to the first terminal among the plurality of DUTs 300, and outputs this physical address.

In the connection example shown in FIG. 10, when a logical address identifying the first terminal of a DUT 300 is received, the pin map table 66 outputs a physical address identifying the first, ninth, seventeenth, and twenty-fifth pins (physical pin number=1, 9, 17, 25) of the test module connected to the first terminals of the DUTs 300.

The pin map table 66 may switch the referenced connection relationship for each thread 40 and each control apparatus 18, i.e. for each type of connected DUT 300. In other words, the pin map table 66 may switch the referenced connection relationship according to the site number and context number supplied from the input/output section 64, and output the corresponding physical address.

FIG. 12 shows exemplary candidates for a physical address identifying DUTs 300 to be test targets, stored in the DUT map table 68. The DUT map table 68 outputs a physical address identifying the testing sections 32 connected to one or more DUTs 300 that are to be test targets, from among the DUTs 300 connected to the test module 20.

In the example of FIG. 12, the DUT map table 68 stores candidates for four physical addresses. More specifically, in this case, the DUT map table 68 stores candidates for a physical address in a case where the first DUT 300 among the four DUTs 300 is the test target, a physical address in a case where the second DUT 300 among the four DUTs 300 is the test target, a physical address in a case where the first and third DUTs 300 among the four DUTs 300 are the test target, and a physical address in a case where all of the four DUTs 300 are the test target.

The DUT map table 68 outputs one physical address designated by a pointer stored in the pointer storage section 70, from among the stored candidate physical addresses, as the physical address identifying the testing sections 32 connected to the DUTs 300 to be test targets. Prior to the execution of the test programs, the control apparatus 18 selects the DUTs 300 to be test targets, and writes the pointer in the pointer storage section 70 to set the selected DUTs 300 as test targets. As a result, the DUT map table 68 can output a physical address identifying the DUTs 300 to be test targets of the test programs.

The pointer storage section 70 stores a pointer for each thread 40 and each control apparatus 18. The pointer storage section 70 switches the pointer according to the site number and context number supplied from the input/output section 64, and outputs the corresponding information. As a result, the DUT map table 68 can switch the DUTs 300 to be test targets for each thread 40 and each control apparatus 18, i.e. each type of connected DUT 300.

Figure 13:
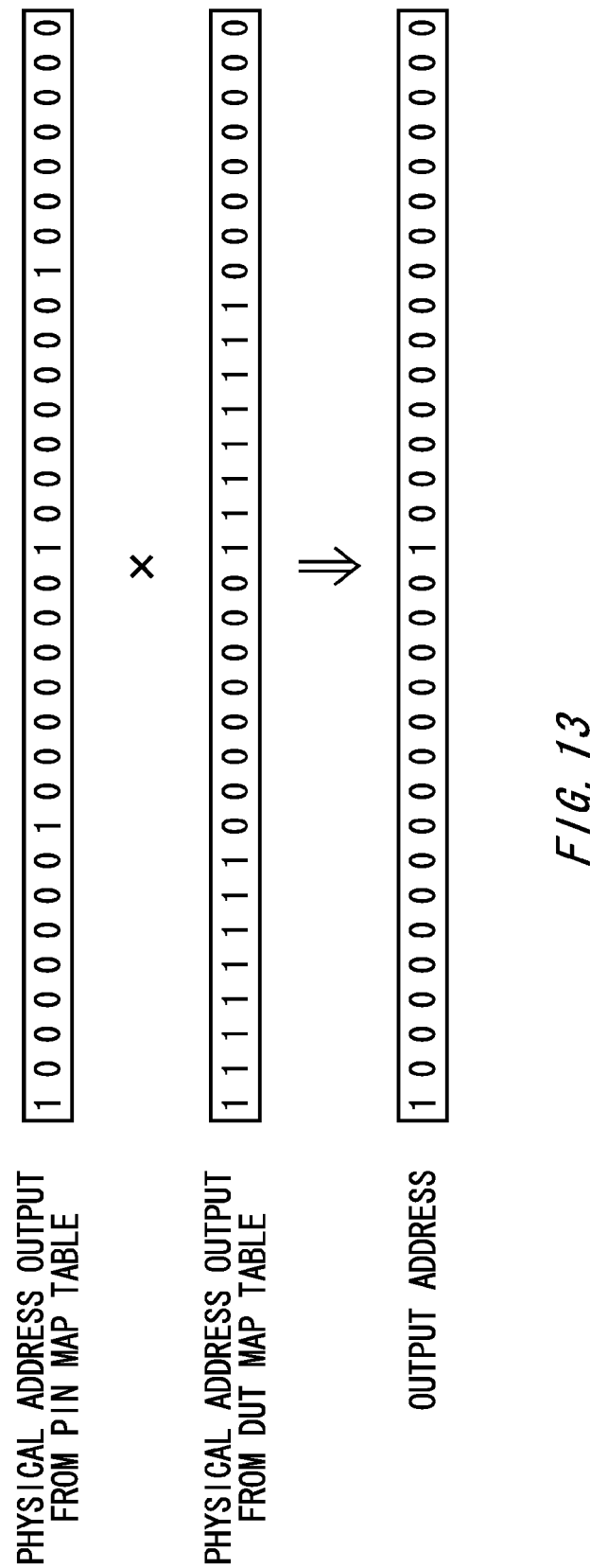
FIG. 13 shows an exemplary process performed by the AND circuit 72.

FIG. 13 shows an exemplary process performed by the AND circuit 72. The AND circuit 72 calculates, for each corresponding bit, the AND of the physical address output from the pin map table 66, i.e. the physical address identifying testing sections 32 connected to the terminals that are control targets, and the physical address output from the DUT map table 68, i.e. the physical address identifying testing sections 32 connected to the DUTs 300 that are test targets.

For example, as shown in FIG. 13, when four DUTs 300 that each have eight terminals are tested simultaneously, the AND circuit 72 receives from the pin map table 66 the physical address identifying the first terminals of all four DUTs 300. Furthermore, in this case, the AND circuit 72 receives from the DUT map table 68 the physical address designating the first and third DUTs 300 among the four DUTs 300.

In this case, the AND circuit 72 calculates the AND of each bit for these two physical addresses, and outputs an output address that designates the first terminal of the first DUT 300 and the first terminal of the third DUT 300. In this way, during testing, the AND circuit 72 can supply the accessing section 74 with a physical address indicating the testing sections 32 that are to exchange signals with the DUTs 300.

Figure 14:
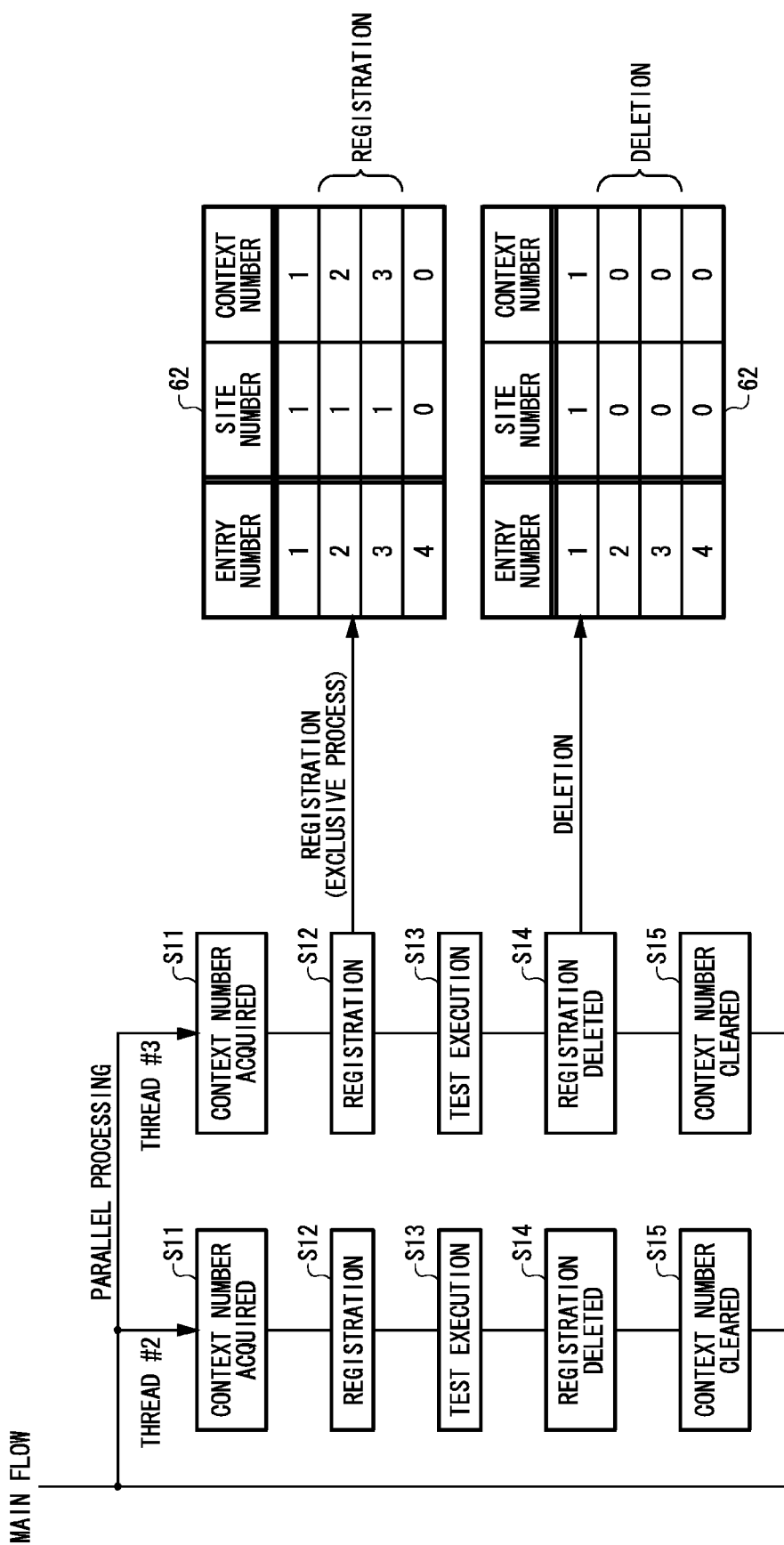
FIG. 14 shows an exemplary process performed by a control apparatus 18 when performing parallel testing.

FIG. 14 shows an exemplary process performed by a control apparatus 18 when performing parallel testing. When a plurality of test programs are executed in parallel, the control apparatus 18 executes each program using a different thread 40.

When parallel processing begins, each thread 40 performs the processes from step S11 to step S15. First, at step S11, each thread 40 newly acquires its own context number. In this case, each thread 40 acquires a number that is different from the numbers of other threads 40 within the control apparatus 18.

Next, at step S12, each thread 40 writes its own identification information, i.e. a set of a site number and a context number, to the assignment storage section 62 of the test module 20 included in the testing section 32 to perform access, i.e. the testing section 32 to be used as a resource. In this case, each thread 40 exclusively stores its own identification information at the first empty entry that appears, starting from the first entry in the assignment storage section 62. As a result, each thread 40 can be registered without the same testing section 32 being used by two or more different threads 40.

Next, at step S13, each thread 40 executes the test program. As a result, test programs are executed respectively by the threads 40, and therefore the control apparatus 18 can execute a plurality of test programs in parallel.

When the process of step S13 is finished, at step S14, each thread 40 deletes its own identification information from the assignment storage section 62 of the test module 20 including the testing section 32 used for access. As a result, each thread 40 can free up the testing section 32 used as a resource to be used by another thread 40.

Next, at step S15, each thread 40 clears the acquired context number. When the process of step S15 is finished, each thread 40 ends the parallel processing. In the manner described above, the control apparatus 18 can execute a plurality of test programs in parallel.

Figure 15:
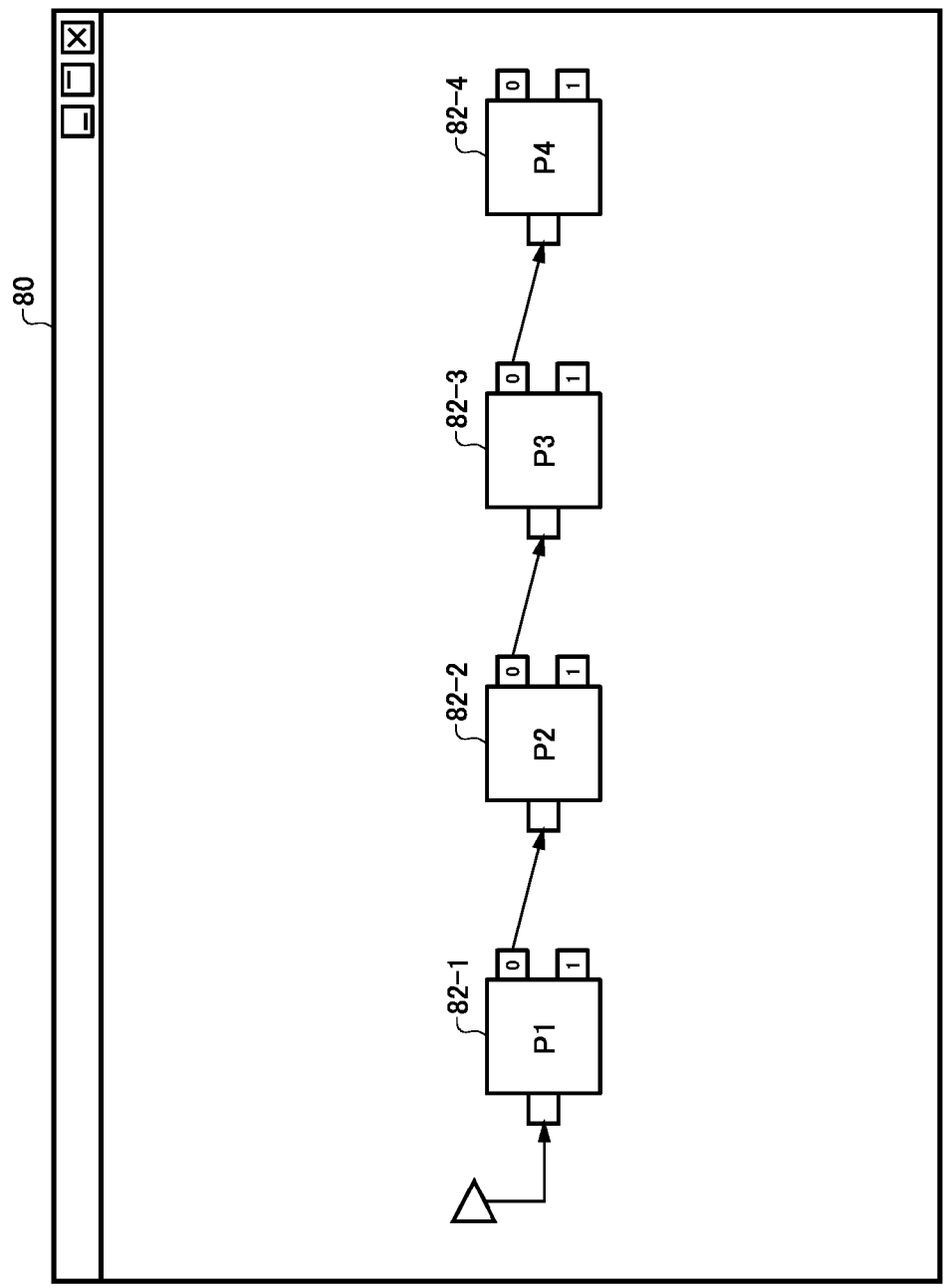
FIG. 15 shows an exemplary program editing screen 80 when a plurality of test programs are executed sequentially.

FIG. 15 shows an exemplary program editing screen 80 when a plurality of test programs are executed sequentially. The editing apparatus 28 can edit the execution order of test programs executed by the corresponding control apparatuses 18, according to an operation by the user.

For example, the editing apparatus 28 may display an icon 82 indicating the presence of each test program in the editing screen 80. In the example of FIG. 15, the editing apparatus 28 displays first to fourth icons 82-1 to 82-4 corresponding respectively to first to fourth test programs, in the editing screen 80.

When a user performs an operation of connecting a plurality of the icons 82 in series, for example, the editing apparatus 28 receives this operation as instructions to sequentially execute the test programs corresponding to these connected icons 82. In the example of FIG. 15, the first icon 82-1, the second icon 82-2, the third icon 82-3, and the fourth icon 82-4 are connected in series in the stated order, and therefore the editing apparatus 28 receives this operation as instructions to sequentially execute the first test program, the second test program, the third test program, and the fourth test program in the stated order.

Upon receiving instructions to sequentially execute a plurality of programs from the corresponding editing apparatus 28, the control apparatus 18 sequentially executes these test programs. In the example of FIG. 15, the control apparatus 18 sequentially executes the first test program, the second test program, the third test program, and the fourth test program in the stated order. In this way, the control apparatus 18 can sequentially execute a plurality of test programs according to an operation by a user.

Figure 16:
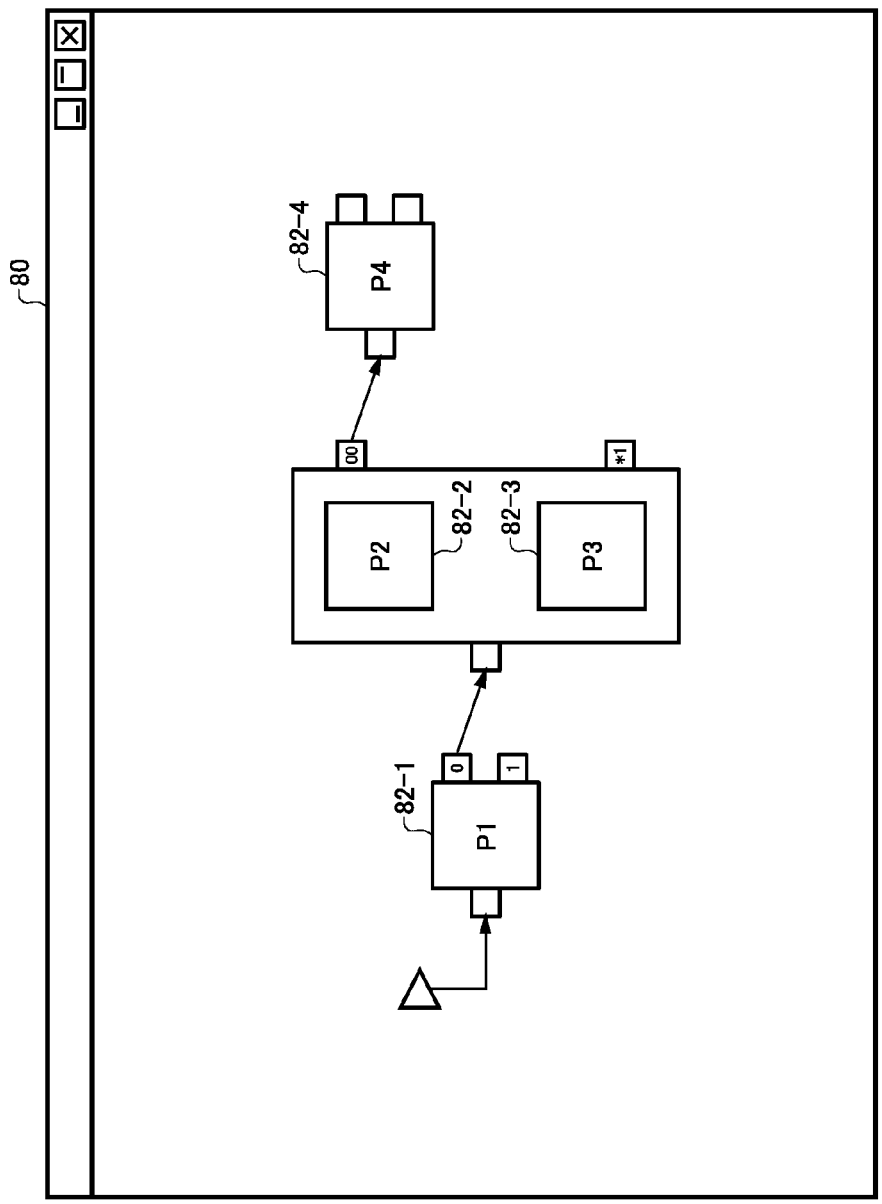
FIG. 16 shows an exemplary program editing screen 80 when a plurality of test programs are executed in parallel.

FIG. 16 shows an exemplary program editing screen 80 when a plurality of test programs are executed in parallel. When the user performs an operation to connect a plurality of icons 82 in parallel, the editing apparatus 28 receives this operation as instructions to execute in parallel the test programs corresponding to the icons 82 connected in parallel. In the example of FIG. 16, the second icon 82-2 and the third icon 82-3 are connected in parallel, and therefore the editing apparatus 28 receives this operation as instructions to execute the second test program and the third test program in parallel.

Upon receiving the instructions to execute a plurality of test programs in parallel from the corresponding editing apparatus 28, the control apparatus 18 executes these test programs in parallel. In the example of FIG. 16, the control apparatus 18 executes the second test program and the third test program in parallel. In this way, the control apparatus 18 can execute a plurality of test programs in parallel, according to an operation by a user.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A test apparatus that tests a device under test, comprising:
   one or more test modules that each include a plurality of testing sections that test the device under test by exchanging signals with the device under test; and
   a plurality of control apparatuses that control operation of the testing sections, wherein
   each of the testing sections is allocated to one of the control apparatuses and, in each of the one or more test modules, at least two of the plurality of testing sections are allocated to different control apparatuses from among the plurality of control apparatuses, such that the plurality of testing sections in each of the one or more test modules can execute different tests under the control of different control apparatuses simultaneously,
   each of the control apparatuses is capable of executing a test program managed by a different user, and controls operation of the testing sections allocated thereto,
   each of the one or more test modules further includes an interface section that, according to a command received from one of the control apparatuses, accesses one of the testing sections assigned to the control apparatus that transmitted the command,
   in each of the one or more test modules, the interface section includes an assignment storage section that stores an entry of identification information for each of the testing sections in the test module, the identification information indicating the control apparatus that is assigned to the testing section, such that the at least two of the plurality of testing sections are allocated to different control apparatuses by their respective entries of identification information in the assignment storage section,
   each control apparatus, prior to executing a thread of a new test program, exclusively stores identification information for identifying the control apparatus in an empty entry of the assignment storage section of a test module of the one or more test modules, the identification information including a set of a site number indicating the control apparatus and a context number indicating the thread,
   each control apparatus executes in parallel a plurality of threads corresponding respectively to a plurality of test programs,
   during execution of a thread, each control apparatus transmits to a test module of the one or more test modules a command that includes a set of a site number indicating the control apparatus and a context number indicating the thread, and
   in each of the one or more test modules, the interface section further includes an input/output section that acquires the command in a case where the set of the site number and the context number contained in the received command are included in the identification information stored in the assignment storage section and discards the command in a case where the set of the site number and the context number contained in the received command are not included in the identification information stored in the assignment storage section.

2. The test apparatus according to claim 1, wherein
   from among one or more devices under test designated as test targets by the received command, the interface section masks access to devices under test other than the one or more devices under test corresponding to the set of the site number and the context number.

3. The test apparatus according to claim 1, wherein
   each control apparatus transmits to the test module the command including a logical address identifying one or more terminals of the device under test,
   the interface section further includes a pin map table that stores a connection relationship between terminals of the device under test and the testing sections of the corresponding test module,
   the input/output section supplies the pin map table with a logical address contained in the acquired command, and
   in response to receiving the logical address, the pin map table outputs a physical address identifying one or more testing sections connected to the one or more terminals of the device under test identified by the logical address.

4. The test apparatus according to claim 3, wherein the interface section further includes:
   a DUT map table that stores a plurality of candidates among physical addresses corresponding to sets of a site number and a context number, which are candidates for the physical address identifying the terminal of the device under test that is to be a test target, and outputs the physical address corresponding to the set of a site number and a context number contained in the command acquired by the input/output section, from among the plurality of candidates; and
   an AND circuit that outputs a physical address identifying only the testing section corresponding to the terminal identified by the physical address output from the DUT map table, from among the one or more of the testing sections designated by the physical address output from the pin map table.

5. The test apparatus according to claim 4, wherein
   the interface section further includes an accessing section that accesses the one or more testing sections identified by the physical address, according to the command.

6. The test apparatus according to claim 1, further comprising a plurality of editing apparatuses that are provided to correspond respectively to the plurality of control apparatuses, and that each enables a user to edit the test programs to be executed by the corresponding control apparatus.

7. A test module for use in a test apparatus that tests a device under test, the test module comprising
   a plurality of testing sections that test the device under test by exchanging signals with the device under test, each of the testing sections allocated to a control apparatus from among a plurality of control apparatuses that control operation of the testing section and are each capable of executing a test program managed by a different user, at least two of the plurality of testing sections allocated to different control apparatuses from among the plurality of control apparatuses, such that the plurality of testing sections can execute different tests under the control of different control apparatuses simultaneously; and
   an interface section that, according to a command received from one of the control apparatuses, accesses one of the testing sections assigned to the control apparatus that transmitted the command, wherein the interface section includes an assignment storage section that stores an entry of identification information for each of the testing sections in the test module, the identification information indicating the control apparatus that is assigned to the testing section, such that the at least two of the plurality of testing sections are allocated to different control apparatuses by their respective entries of identification information in the assignment storage section, each control apparatus, prior to executing a thread of a new test program, exclusively stores identification information for identifying the control apparatus in an empty entry of the assignment storage section of the test module, the identification information including a set of a site number indicating the control apparatus and a context number indicating the thread, each control apparatus executes in parallel a plurality of threads corresponding respectively to a plurality of test programs, during execution of a thread, each control apparatus transmits to the test module a command that includes a set of a site number indicating the control apparatus and a context number indicating the thread, and the interface section further includes an input/output section that acquires the command in a case where the set of the site number and the context number contained in the received command are included in the identification information stored in the assignment storage section and discards the command in a case where the set of the site number and the context number contained in the received command are not included in the identification information stored in the assignment storage section.

* * * * *